(12) United States Patent
Miyazaki et al.

(10) Patent No.: US 7,789,209 B2
(45) Date of Patent: Sep. 7, 2010

(54) FRICTION PLATE AND WET-TYPE MULTI-PLATE CLUTCH

(75) Inventors: Tomoyuki Miyazaki, Fukuroi (JP); Ritsuo Toya, Fukuroi (JP); Tsuyoshi Hirayanagi, Fukuroi (JP); Masahiro Kobayashi, Fukuroi (JP)

(73) Assignee: NSK Warner K.K., Tokyo (JP)

( * ) Notice: Subject to any disclaimer, the term of this patent is extended or adjusted under 35 U.S.C. 154(b) by 506 days.

(21) Appl. No.: 11/591,519

(22) Filed: Nov. 2, 2006

(65) Prior Publication Data
US 2007/0102258 A1 May 10, 2007

(30) Foreign Application Priority Data
Nov. 8, 2005 (JP) ............................. 2005-323238

(51) Int. Cl.
F16D 13/72 (2006.01)
F16D 13/64 (2006.01)

(52) U.S. Cl. ................................. 192/70.12; 192/113.36
(58) Field of Classification Search ............. 192/113.36
See application file for complete search history.

(56) References Cited

U.S. PATENT DOCUMENTS

| 4,027,758 | A | | 6/1977 | Gustavsson et al. | |
|---|---|---|---|---|---|
| 4,287,978 | A | * | 9/1981 | Staub, Jr. ................ | 192/113.36 |
| 4,674,616 | A | * | 6/1987 | Mannino, Jr. ........... | 192/113.36 |
| 5,094,331 | A | * | 3/1992 | Fujimoto et al. ......... | 192/70.12 |
| 5,335,765 | A | | 8/1994 | Takakura et al. | |
| 5,954,172 | A | | 9/1999 | Mori | |
| 5,975,260 | A | * | 11/1999 | Fischer et al. .......... | 192/113.36 |
| 6,035,991 | A | | 3/2000 | Willwerth et al. | |
| 6,062,367 | A | * | 5/2000 | Hirayanagi et al. .... | 192/113.36 |
| 6,203,649 | B1 | * | 3/2001 | Kremsmair et al. .... | 192/113.36 |
| 6,712,190 | B2 | * | 3/2004 | Kitaori et al. .......... | 192/113.36 |
| 6,776,272 | B2 | | 8/2004 | Granderath | |
| 7,000,747 | B2 | | 2/2006 | Back et al. | |
| 7,073,650 | B2 | | 7/2006 | Fabricius et al. | |
| 7,172,062 | B2 | | 2/2007 | Kitahara et al. | |
| 2005/0011720 | A1 | | 1/2005 | Adair et al. | |
| 2005/0109576 | A1 | | 5/2005 | Kitahara et al. | |
| 2005/0224310 | A1 | | 10/2005 | Li et al. | |
| 2007/0017773 | A1 | | 1/2007 | Suzuki et al. | |
| 2007/0199794 | A1 | * | 8/2007 | Miyazaki et al. ........ | 192/113.36 |
| 2008/0156611 | A1 | * | 7/2008 | Hirayanagi ............. | 192/107 R |
| 2008/0179161 | A1 | * | 7/2008 | Kobayashi et al. ...... | 192/107 R |

FOREIGN PATENT DOCUMENTS

| JP | 11-141570 | 5/1999 |
|---|---|---|
| JP | 2002-181073 A | 6/2002 |
| JP | 2005-76759 | 3/2005 |
| WO | WO 2008/148461 A1 | 12/2008 |

* cited by examiner

Primary Examiner—Rodney H Bonck
(74) Attorney, Agent, or Firm—Miles & Stockbridge P.C.

(57) ABSTRACT

The present invention provides a friction plate having a friction surface formed by adhering a friction material to a substantially annular core plate and wherein the friction surface is provided with an oil passage communicated with inner and outer peripheral edges of the friction plate, a first oil groove having an opening portion opened to the inner peripheral edge of the friction plate and an end portion terminating at a position between the inner and outer peripheral edges, and a second first oil groove having an opening portion opened to the outer peripheral edge of the friction plate and an end portion terminating at a position between the inner and outer peripheral edges.

11 Claims, 5 Drawing Sheets

FRICTION PLATE AND WET-TYPE MULTI-PLATE CLUTCH

BACKGROUND OF THE INVENTION

1. Field of the Invention

The present invention relates to a friction plate used in a clutch or a brake of an automatic transmission (AT) of a vehicle, and, a wet-type multi-plate clutch having such a friction plate. More specifically, the present invention relates to an improvement in an oil passage formed in a friction surface of the friction plate.

2. Related Background Art

Generally, in a wet-type multi-plate clutch, friction plates and separator plates are alternately arranged between a drum and a hub of a clutch or a brake, so that engagement and disengagement of the clutch are performed by urging and releasing of a clutch piston.

Further, in recent years, request for reduction of fuel consumption in a vehicle has been increased more and more, and, in also an automatic transmission, in order to reduce power loss during disengagement of the clutch, reduction in drag torque between the friction plate and the separator plate has been requested.

Generally, in plate clutch used in the automatic transmission is many cases, the wet-type multi-designed so that lubricating oil can easily pass from an inner peripheral side to an outer peripheral side of the friction plate, thereby reducing the drag torque. An example of techniques for reducing the drag torque is known from, for example, Japanese Patent Application Laid-Open Nos. H11-141570 (1999) and 2005-76759. In clutches disclosed in the Japanese Patent Application Laid-Open Nos. H11-141570 (1999) and 2005-76759, the friction plate is provided with an oil groove having an inner peripheral side closed end for separation between the friction plate and the separator plate during the disengagement and an oil supplying passage extending in an inner-and-outer diameter direction for preventing seizure by supplying lubricating oil to a friction surface of the friction plate during the engagement.

However, in recent years, in order to enhance transmission response for enhancing a power performance as well as the reduction of the fuel consumption, a clearance between the friction plate and the separator plate has been made smaller in comparison with the conventional cases, with the result that, during an idle rotation, the drag torque tends to be increased due to the presence of the oil film therebetween.

The oil supplied to the oil passage extending from the inner diameter side to the outer diameter side is drawn to a friction material by a rotation and, if the drawn oil is brought between the friction plate and the separator plate, the oil is hardly discharged, and, particularly, in an area having small clearance between the friction plate and the separator plate and small number of revolutions, such a tendency conspicuous and the drag torque becomes greater due to viscosity between the friction material and the corresponding separator plate.

In conventional friction plates, since the lubricating oil on the friction surface is not discharged adequately, a request for further reducing the drag torque could not be satisfied. In particular, during a low rotation, since the oil interposed between the friction plate and the separator plate was not discharged adequately, the drag torque could not be reduced.

However, in order to meet a requirement for compactness and lighter-weight in recent automatic transmissions, it has been desired that a friction capacity of each friction plate be increased. To this end, the number of grooves to be formed in the friction plate, as well as the dimension of each groove, has been limited severely.

SUMMARY OF THE INVENTION

Accordingly, an object of the present invention is to provide a friction plate which has good heat resistance and in which shock caused upon engagement is reduced and drag torque during an idle rotation can be greatly reduced in comparison with conventional cases, and a wet-type multi-plate clutch having such a friction plate.

To achieve the above object, the present invention provides a friction plate having a friction surface formed by adhering a friction material to a substantially annular core plate and wherein the friction surface is provided with an oil passage communicated with inner and outer peripheral edges of the friction plate, a first oil groove having an opening portion opened to the inner peripheral edge of the friction plate and an end portion terminating at a position between the inner and outer peripheral edges, and a second oil groove having an opening portion opened to the outer peripheral edge of the friction plate and an end portion terminating at a position between the inner and outer peripheral edges.

According to the present invention, the following effects can be obtained:

Since the oil groove opened only to the outer diameter side is provided in the surface of the friction material, oil drawn from the oil passage to the friction surface can be discharged smoothly toward the outer diameter side, with the result that the drag torque can be reduced in the idle rotation. Particularly, during a low rotation, the drag torque can be reduced considerably. Further, since the drawn oil can be removed smoothly, friction heat generated during engagement can also be removed smoothly together with the oil, thereby enhancing heat resistance of the friction material.

When the oil groove opened to the outer diameter side to remove the oil is configured so that a width of the oil groove is gradually increased toward the outer diameter side, the oil removing ability is increased. Various shapes of the oil passage and the oil grooves may be contemplated in accordance with an area of the friction surface, a friction property and/or an amount of oil to be supplied.

Further, the oil groove opened to the inner diameter side and having the closed end portion has a function for maintaining the clearance between the friction plate and the separator plate constant during the idle rotation by an action for separating the friction plate and the separator plate from each other and a function for disengaging the clutch smoothly during the releasing of the clutch and a cushion function for preventing abrupt abutment of the clutch in the initial engagement.

Further, when the width of the oil passage is smaller at the outer diameter side than at the inner diameter side, a more amount of oil can be supplied to the friction surface, whereas, conversely, when the width is greater at the outer diameter side, an amount of oil discharged from the oil passage is increased.

Various designs can be adopted on the basis of oil supplying amounts and rotating conditions used. Similarly, when a width of the oil groove opened to the inner diameter side is greater at the inner diameter side, the effect for separating the friction material can be more enhanced. Incidentally, when both of the oil passage and the oil grooves are formed in an inclined manner with respect to a radial direction, the oil discharging ability of the friction surface is more enhanced.

Further features of the present invention will become apparent from the following description of exemplary embodiments (with reference to the attached drawings).

DESCRIPTION OF THE PREFERRED EMBODIMENTS

Figure 1:
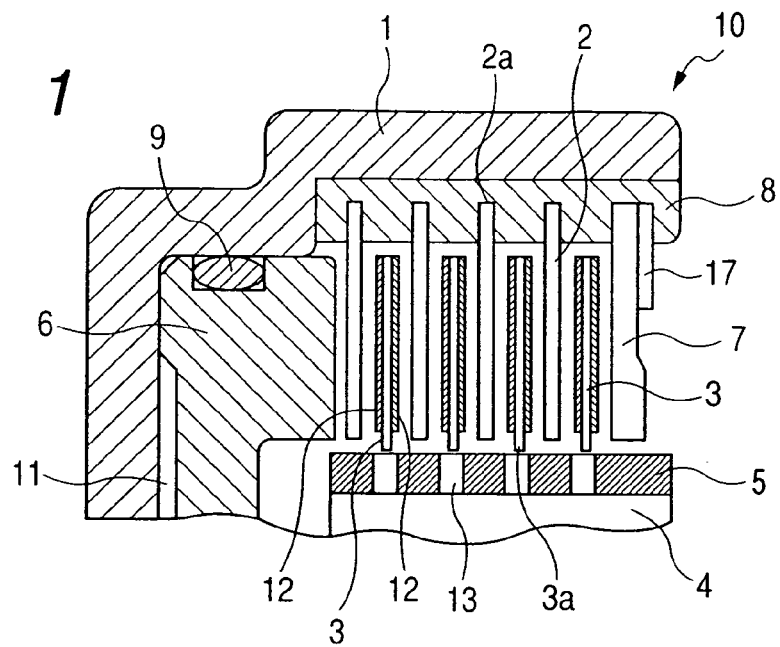
FIG. 1 is an axial partial sectional view of a wet-type multi-plate clutch 10 having friction plates of the present invention.

Now, the present invention will be fully described with reference to the accompanying drawings. Incidentally, in the drawings, the same parts or elements are designated by the same reference numerals.

FIG. 1 is an axial partial sectional view of a wet-type multi-plate clutch 10 having friction plates of the present invention.

The wet-type multi-plate clutch 10 comprises a substantially cylindrical drum or clutch case 1 having an opened axial one end, a hub 4 disposed within the clutch case 1 and rotatable coaxially with and relative to the clutch case, annular separator plates 2 received in splines 8 formed in an inner peripheral surface of the clutch case 1 for an axial movement, and annular friction plates 3 received in splines 5 formed in an outer peripheral surface of the hub 4 and arranged alternately with the separator plates 2 and onto which friction materials are stuck. Plural separator plates 2 and plural friction plates 3 are provided.

The wet-type multi-plate clutch 10 further includes a piston 6 for urging the separator plates 2 and the friction plates 3 to cause them to engage with each other, a backing plate 7 provided on the inner peripheral surface of the clutch case 1 to hold the separator plates 2 and the friction plates 3 in a fixed condition at an axial one end, and a stop ring 17 for holding the backing plate.

As shown in FIG. 1, the piston 6 is disposed within a closed end portion of the clutch case 1 for an axial sliding movement. An O-ring 9 is disposed between an outer peripheral surface of the piston 6 and the inner surface of the clutch case 1. Further, a sealing member (not shown) is also disposed between an inner peripheral surface of the piston 6 and an outer peripheral surface of a cylindrical portion (not shown) of the clutch case 1. Accordingly, an oil-tight hydraulic chamber 11 is defined between an inner surface of the closed-end portion of the clutch case 1 and the piston 6.

Friction materials 12 each having predetermined coefficient of friction are fixedly stuck to both surfaces of each of the friction plates 3 held by the hub 4 for an axial sliding movement. However, the friction material 12 may be provided on only one surface of the friction plate 3. Further, lubricating oil supplying ports 13 passing radially through the hub 4 are provided to supply the lubricating oil from the inner diameter side to the outer diameter side of the wet-type multi-plate clutch 10.

The wet-type multi-plate clutch 10 having the above-mentioned arrangement is engaged (tightened) and disengaged (released) as follows. In a condition shown in FIG. 1, which is a clutch released or disengaged condition, the separator plates 2 and the friction plates 3 are separated from each other. In the released condition, the piston 6 abuts against a closed end portion of the clutch case 1 by a biasing force of a return spring (not shown).

From this condition, in order to tighten or engage the clutch, hydraulic pressure is supplied into the hydraulic chamber 11 defined between the piston 6 and the clutch case 1. As the hydraulic pressure is increased, the piston 6 is shifted axially to the right (FIG. 1) in opposition to the biasing force of the return spring (not shown), thereby closely contacting the separator plates 2 and the friction plates 3 with each other. In this way, the clutch is tightened or engaged.

After the engagement, in order to release or disengage the clutch again, the hydraulic pressure in the hydraulic chamber 11 is released. When the hydraulic pressure is released, by the biasing force of the return spring (not shown), the piston 6 is shifted until it abuts against the closed end portion of the clutch case 1. In this way, the clutch is disengaged or released.

First Embodiment

Figure 2:
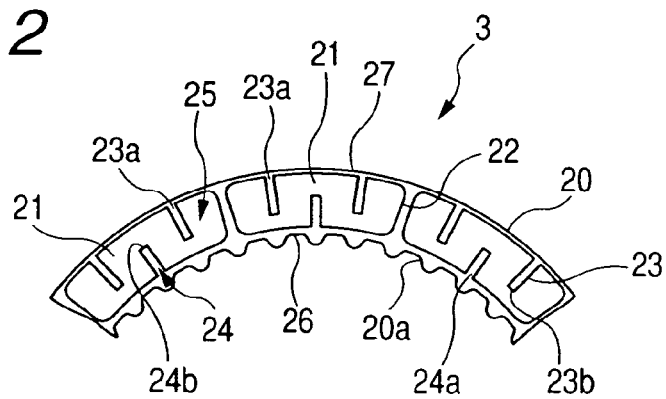
FIG. 2 is a partial front view of a friction plate according to a first embodiment of the present invention.

FIG. 2 is a partial front view of a friction plate 3 according to a first embodiment of the present invention. The friction plate 3 has a friction surface 25 obtained by adhering a plurality of friction material segments 21 to a substantially annular core plate 20 by an adhesive. The core plate 20 is provided with at its inner periphery with splines 20a for engaging with splines 5 of the hub 4.

As shown, each friction material segment 21 is provided with a first oil groove 24 having an opening portion 24a opened to an inner peripheral edge 26 of the friction plate 3 and an end portion 24b terminating at a position between inner and outer peripheral edges, and second oil grooves 23 each having an opening portion 23a opened to an outer peripheral edge 27 of the friction plate 3 and an end portion 23b terminating at a position between the inner and outer peripheral edges. In each segment, a single first oil groove 24 is provided and two second oil grooves 23 are arranged on both sides of the first oil groove 24 in a circumferential direction.

A gap having a predetermined circumferential width is formed between the adjacent friction material segments 21 and the gap constitutes an oil passage 22 extending from the outer diameter side to the inner diameter side.

The friction surface 25 is provided with the oil passage 22 extending from the outer diameter side to the inner diameter side and the second oil grooves opened to the outer peripheral edge 27. Accordingly, the lubricating oil for lubricating the friction engagement surface is discharged toward the outer diameter side by a centrifugal force and the lubricating oil drawn from the oil passage to the friction surface 25 is discharged smoothly toward the outer diameter side through the second oil grooves 23, thereby reducing the drag torque in the idle rotation.

Both first and second oil grooves 24 and 23 are formed to have a substantially constant circumferential width extending from the opening portion to the end portion.

Second Embodiment

Figure 3:
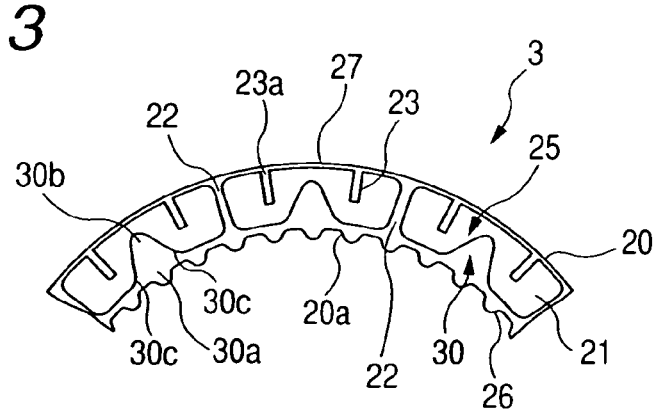
FIG. 3 is a partial front view of a friction plate according to a second embodiment of the present invention.

FIG. 3 is a partial front view of a friction plate 3 according to a second embodiment of the present invention. A fundamental construction of the second embodiment is the same as that of the first embodiment. Accordingly, only a difference will be described. Also in third to thirteenth embodiments which will be described later, only differences will be described.

In the second embodiment, a first oil groove 30 having an opening portion 30a opened to the inner peripheral edge 26 of the friction plate 3 and an end portion 30b terminating at a position between inner and outer peripheral edges is provided in each segment. As shown, the first oil groove 30 has a tapered portion 30c extending from both circumferential ends of the opening portion 30a to the end portion 30b. Accordingly, the first oil groove 30 is tapered so that a circumferential width of the oil groove is gradually increased from the end portion 30b to the opening portion 30a.

Third Embodiment

Figure 4:
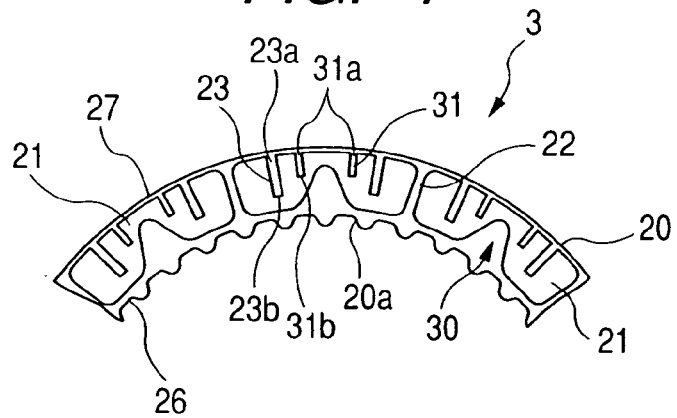
FIG. 4 is a partial front view of a friction plate according to a third embodiment of the present invention.

FIG. 4 is a partial front view of a friction plate 3 according to a third embodiment of the present invention. A fundamental construction of the third embodiment is the same as that of the first embodiment. Accordingly, only a difference will be described.

The third embodiment is an alteration of the second embodiment, in which constructions of a first oil groove 30 and second oil grooves 23 are substantially the same as those in the second embodiment. In the third embodiment, a difference is that third oil grooves 31 are provided in each segment. Each of the third oil grooves 31 has an opening portion 31a at the outer peripheral edge 27 and an end portion 31b terminating at a position between the inner and outer peripheral edges.

Each third oil groove 31 is disposed between the first oil groove 30 and the second oil groove 23 and a radial length of the third oil groove is shorter than a length of the second oil groove 23. Further, a circumferential width of the third oil groove is substantially uniform from the opening portion 31a to the end portion 31b.

Fourth Embodiment

Figure 5:
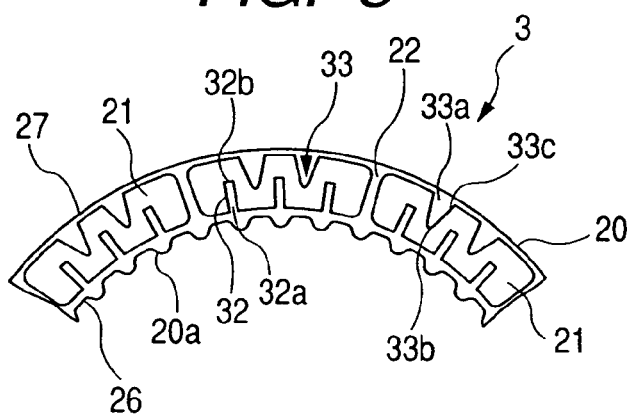
FIG. 5 is a partial front view of a friction plate according to a fourth embodiment of the present invention.

FIG. 5 is a partial front view of a friction plate 3 according to a fourth embodiment of the present invention. A fundamental construction of the fourth embodiment is the same as that of the first embodiment. Accordingly, only a difference will be described.

In the first to third embodiments, while an example that the single first oil groove having the opening portion at the inner peripheral edge 26 is provided was explained, in the fourth embodiment, three first oil grooves 32 each having an opening portion 32a at the inner peripheral edge 26 and an end portion 32b terminating at a position between the inner and outer peripheral edges are provided.

Further, each of second oil grooves 33 has an opening portion 33a at the outer peripheral edge 27 and an end portion 33b terminating at a position between the inner and the outer peripheral edges. The second oil groove 33 has a tapered portion 33c between the opening portion 33a and the end portion 33b. Accordingly, the second oil groove 33 is tapered so that a circumferential width of the oil groove is gradually increased from the end portion 33b to the opening portion 33a. Two second oil grooves 33 are provided in each friction material segment 21.

As can be seen from FIG. 5, the first and second oil grooves 32 and 33 are alternately arranged in the circumferential direction.

Fifth Embodiment

Figure 6:
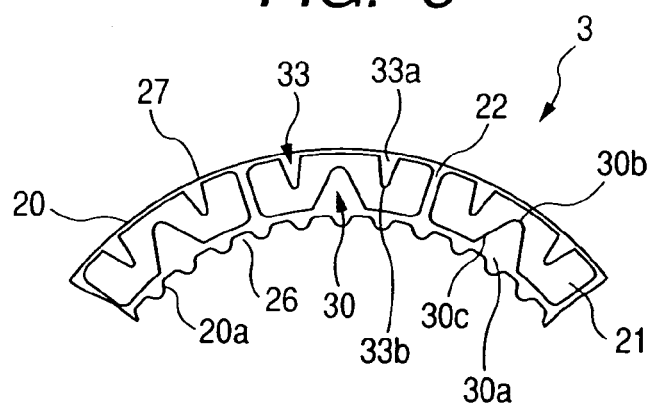
FIG. 6 is a partial front view of a friction plate according to a fifth embodiment of the present invention.

FIG. 6 is a partial front view of a friction plate 3 according to a fifth embodiment of the present invention. A fundamental construction of the fifth embodiment is the same as that of the first embodiment. Accordingly, only a difference will be described.

In the fifth embodiment, it is characterized in that both of first and second oil grooves have tapered shapes. The first oil groove 30 has a tapered portion 30c extending both circumferential ends of the opening portion 30a to the end portion 30b. Accordingly, the first oil groove 30 is tapered so that a circumferential width of the oil groove is gradually increased from the end portion 30b to the opening portion 30a.

The second oil groove 33 has an opening portion 33a at the outer peripheral edge 27 and an end portion 33b terminating at a position between the inner and outer peripheral edges. The second oil groove 33 has a tapered portion 33c between the opening portion 33a and the end portion 33b. Accordingly, the second oil groove 33 is tapered so that a circumferential width of the oil groove is gradually increased from the end portion 33b to the opening portion 33a.

As shown, in each friction material segment, a single first oil groove 30 is provided and two second oil grooves 33 are arranged on both sides of the first oil groove.

Sixth Embodiment

Figure 7:
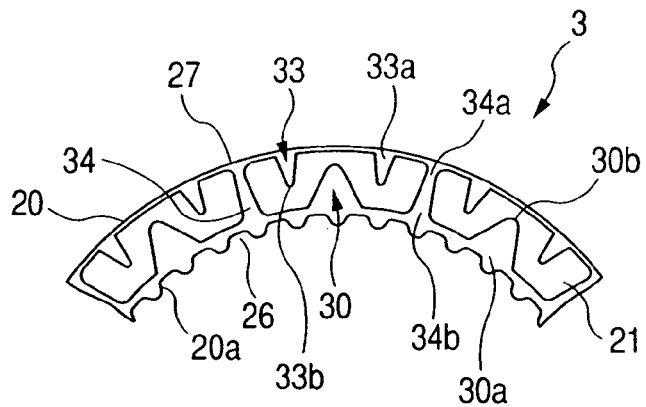
FIG. 7 is a partial front view of a friction plate according to a sixth embodiment of the present invention.

FIG. 7 is a partial front view of a friction plate 3 according to a sixth embodiment of the present invention. A fundamental construction of the sixth embodiment is the same as that of the first embodiment. Accordingly, only a difference will be described.

In the sixth embodiment, a construction of an oil passage differs from those in the first to fifth embodiments. In the first to fifth embodiments, while an example that the width of the oil passage 22 is substantially uniform or constant from the outer diameter side to the inner diameter side of the friction plate 3 was explained, in the sixth embodiment, the oil passage has a tapered shape.

An oil passage 34 extending from the outer diameter side to the inner diameter side of the friction plate 3 has an opening portion 34a at the outer peripheral edge 27 of the friction plate 3 and an opening portion 34b at the inner peripheral edge 26. A circumferential width of the opening portion 34b is greater than a circumferential width of the opening portion 34a. Accordingly, the oil passage 34 is tapered so that the width thereof is gradually increased toward the opening portion 34b.

Seventh Embodiment

Figure 8:
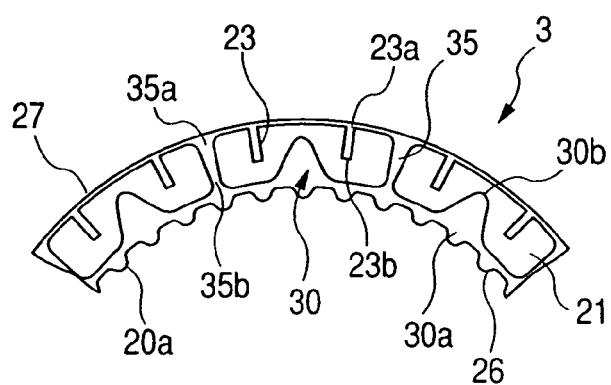
FIG. 8 is a partial front view of a friction plate according to a seventh embodiment of the present invention.

FIG. 8 is a partial front view of a friction plate 3 according to a seventh embodiment of the present invention. A fundamental construction of the seventh embodiment is the same as that of the first embodiment. Accordingly, only a difference will be described.

In the seventh embodiment, a construction of an oil passage differs from those in the first to fifth embodiments. In the first to fifth embodiments, while an example that the width of the oil passage 22 is substantially uniform or constant from the outer diameter side to the inner diameter side of the friction plate 3 was explained, in the seventh embodiment, the oil passage has a tapered shape.

An oil passage 35 extending from the outer diameter side to the inner diameter side of the friction plate 3 has an opening portion 35a at the outer peripheral edge 27 of the friction plate 3 and an opening portion 35b at the inner peripheral edge 26. A circumferential width of the opening portion 35b is smaller than a circumferential width of the opening portion 35a. Accordingly, the oil passage 35 is tapered so that the width thereof is gradually decreased toward the opening portion 35b. Thus, the oil passage 35 has a substantially reverse construction with respect to that of the sixth embodiment.

Eighth Embodiment

Figure 9:
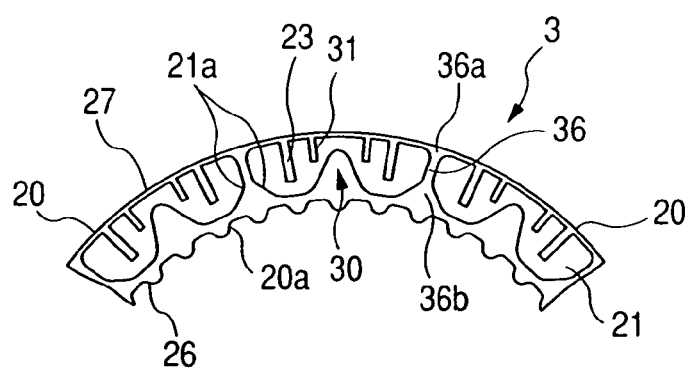
FIG. 9 is a partial front view of a friction plate according to an eighth embodiment of the present invention.

FIG. 9 is a partial front view of a friction plate 3 according to an eighth embodiment of the present invention. A fundamental construction of the eighth embodiment is the same as that of the fourth embodiment. Accordingly, only a difference will be described.

In the eighth embodiment, a construction of an oil passage differs from that in the fourth embodiment. In the fourth embodiment, while an example that the width of the oil passage 22 is substantially uniform or constant from the outer diameter side to the inner diameter side of the friction plate 3 was explained, in the eighth embodiment, a width of one of the opening portions of the oil passage is greater than that of the other opening portion.

An oil passage 36 extending from the outer diameter side to the inner diameter side of the friction plate 3 has an opening portion 36a at the outer peripheral edge 27 of the friction plate 3 and an opening portion 36b at the inner peripheral edge 26. On the other hand, both inner peripheral corners of each friction material segment 21 are chamfered to form chamfered portions 21a.

Accordingly, by providing the chamfered portions 21a at the inner diameter side of the friction plate 3, a circumferential width of the opening portion 36b becomes greater than a circumferential width of the opening portion 36a.

Ninth Embodiment

Figure 10:
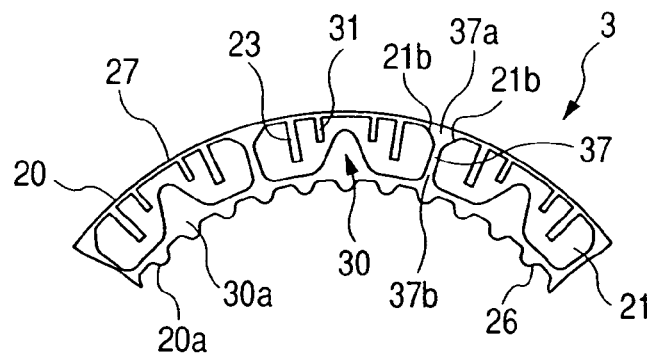
FIG. 10 is a partial front view of a friction plate according to a ninth embodiment of the present invention.

FIG. 10 is a partial front view of a friction plate 3 according to a ninth embodiment of the present invention. A fundamental construction of the ninth embodiment is the same as that of the fourth embodiment. Accordingly, only a difference will be described.

In the ninth embodiment, a construction of an oil passage differs from that in the fourth embodiment. In the fourth embodiment, while an example that the width of the oil passage 22 is substantially uniform or constant from the outer diameter side to the inner diameter side of the friction plate 3 was explained, in the ninth embodiment, a width of one of the opening portions of the oil passage is greater than that of the other opening portion.

An oil passage 37 extending from the outer diameter side to the inner diameter side of the friction plate 3 has an opening portion 37a at the outer peripheral edge 27 of the friction plate 3 and an opening portion 37b at the inner peripheral edge 26. On the other hand, both outer peripheral corners of each friction material segment 21 are chamfered to form chamfered portions 21b.

Accordingly, by providing the chamfered portions 21b at the outer diameter side of the friction plate 3, a circumferential width of the opening portion 37a becomes greater than a circumferential width of the opening portion 37b.

Tenth Embodiment

Figure 11:
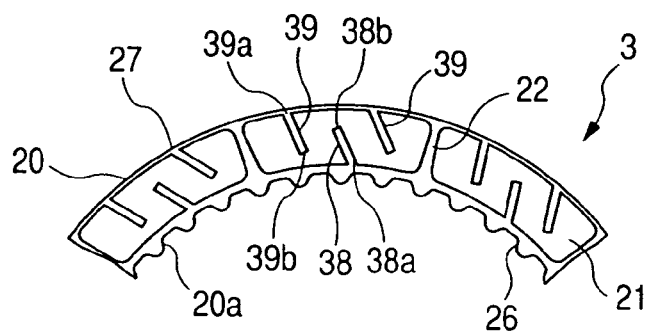
FIG. 11 is a partial front view of a friction plate according to a tenth embodiment of the present invention.

FIG. 11 is a partial front view of a friction plate 3 according to a tenth embodiment of the present invention. A fundamental construction of the tenth embodiment is the same as that of the first embodiment. Accordingly, only a difference will be described.

In the tenth embodiment, first and second oil grooves are formed to be inclined at a predetermined angle with respect to a circumferential direction. Each friction material segment 21 is provided with a first oil groove 38 having an opening portion 38a opened to the inner peripheral edge 26 of the friction plate 3 and an end portion 38b terminating at a position between the inner and outer peripheral edges, and second oil grooves 39 each having an opening portion opened to the outer peripheral edge 27 of the friction plate 3 and an end portion 39b terminating at a position between the inner and outer peripheral edges. A single first oil groove 38 is provided and two second oil grooves 39 are arranged on both sides of the first oil groove.

As can be seen from FIG. 11, the first oil groove 38 and the second oil grooves 39 are inclined at a predetermined angle with respect to a circumferential direction. The inclined angles of the first and second oil grooves 38 and 39 are the same, but these angles may be different.

Eleventh Embodiment

Figure 12:
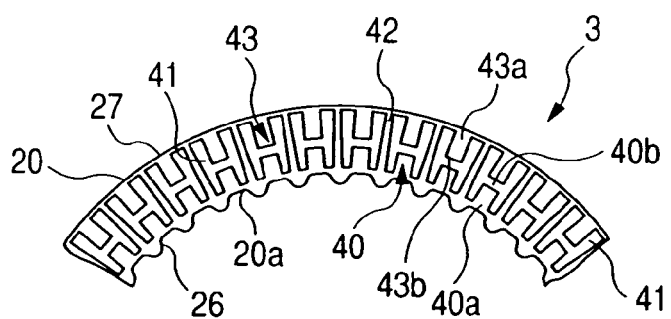
FIG. 12 is a partial front view of a friction plate according to an eleventh embodiment of the present invention.

FIG. 12 is a partial front view of a friction plate 3 according to an eleventh embodiment of the present invention. A fundamental construction of the eleventh embodiment is the same as that of the first embodiment. Accordingly, only a difference will be described.

In the eleventh embodiment, a configuration of a friction material segment differs from those in the first to tenth embodiments. As shown, each of plural friction material segments 41 has a substantially H-shaped configuration. An oil passage 42 is formed between adjacent friction material segments 41.

Each friction material segment 41 is provided with a first oil groove 40 having an opening portion 40a opened to the inner peripheral edge 26 of the friction plate 3 and an end portion 40b terminating at a position between the inner and outer peripheral edges, and a second oil groove 43 having an opening portion 43a opened to the outer peripheral edge 27 of the friction plate 3 and an end portion 43b terminating at a position between the inner and outer peripheral edges. The first oil groove 40 is substantially opposed to the second oil groove 43 in a radial direction.

Twelfth Embodiment

Figure 13:
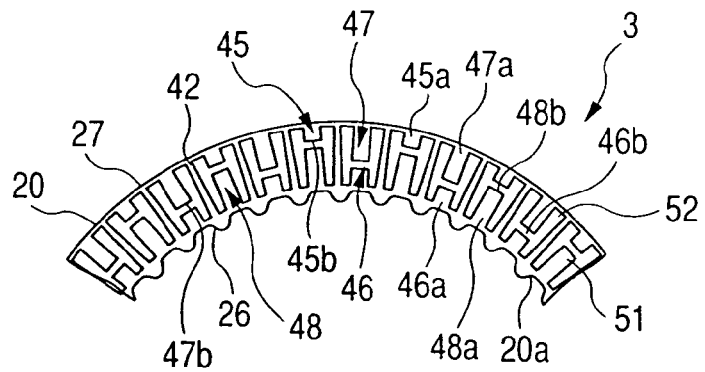
FIG. 13 is a partial front view of a friction plate according to a twelfth embodiment of the present invention.

FIG. 13 is a partial front view of a friction plate 3 according to a twelfth embodiment of the present invention. A fundamental construction of the twelfth embodiment is the same as those of the first and eleventh embodiments. Accordingly, only a difference will be described.

In the twelfth embodiment, a configuration of a friction material segment differs from those in the first to tenth embodiments, and it is said that the twelfth embodiment is alteration of the eleventh embodiment. As shown, each of two kinds of friction material segments 51 and 52 having different length oil grooves has a substantially H-shaped configuration, similar to the eleventh embodiment. The friction material segments 51 and 52 are arranged alternately in a circumferential direction, and an oil passage 42 is defined between the adjacent friction material segments.

The friction material segment 51 is provided with a first oil groove 48 having an opening portion 48a opened to the inner peripheral edge 26 of the friction plate 3 and an end portion 48b terminating at a position between the inner and outer peripheral edges, and a second oil groove 45 having an opening portion 45a opened to the outer peripheral edge 27 of the friction plate 3 and an end portion 45b terminating at a position between the inner and outer peripheral edges. The first oil groove 48 is substantially opposed to the second oil groove 45 in a radial direction.

On the other hand, the friction material segment 52 is provided with a first oil groove 46 having an opening portion 46a opened to the inner peripheral edge 26 of the friction plate 3 and an end portion 46b terminating at a position between the inner and outer peripheral edges, and a second oil groove 47 having an opening portion 47a opened to the outer peripheral edge 27 of the friction plate 3 and an end portion 47b terminating at a position between the inner and outer peripheral edges. The first oil groove 46 is substantially opposed to the second oil groove 47 in a radial direction.

As shown in FIG. 13, the first oil groove 48 is longer than the second oil groove 45 in the radial direction, and the first oil groove 46 is shorter than the second oil groove 47 in the radial direction. Further, the first oil groove 48 has substantially the same length as the second oil groove 47, and the first oil groove 46 has substantially the same length as the second oil groove 45.

Thirteenth Embodiment

Figure 14:
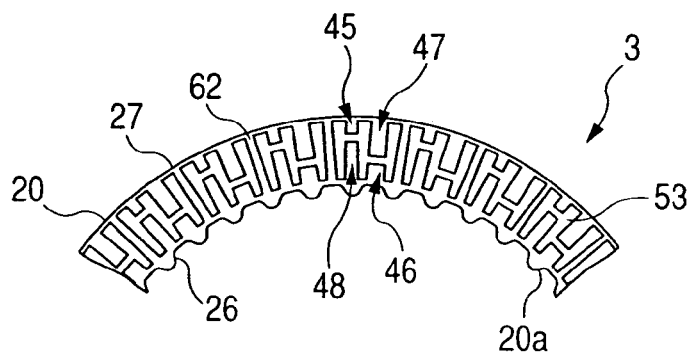
FIG. 14 is a partial front view of a friction plate according to a thirteenth embodiment of the present invention.

FIG. 14 is a partial front view of a friction plate 3 according to a thirteenth embodiment of the present invention. This embodiment has an arrangement in which, in the twelfth embodiment, the first friction material segment 51 and the second friction material segment 52 are combined as a single friction material segment 53.

Accordingly, in the thirteenth embodiment, an oil passage 62 extending from the inner diameter side to the outer diameter side is defined between the friction material segments 53 arranged in a circumferential direction, and, the first oil grooves 46 and 48 and the second oil grooves 45 and 47 are designed in the same manner as the twelfth embodiment.

Figure 15:
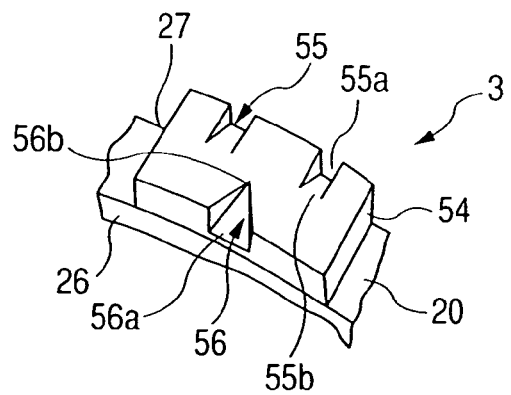
FIG. 15 is a partial perspective view showing an alteration of oil grooves applicable to various embodiments of the present invention.

FIG. 15 is a partial perspective view of a friction plate showing an alteration of oil grooves, which can be applied to various embodiment of the present invention. A friction material segment 54 is provided with a first oil groove 56 having an opening portion 56a opened to the inner peripheral edge 26 of the friction plate 3 and an end portion 56b terminating a position between the inner and outer peripheral edges, and second oil grooves 55 each having an opening portion 55a opened to the outer peripheral edge 27 of the friction plate 3 and an end portion 55b terminating a position between the inner and outer peripheral edges. A single first oil groove 56 is provided and two second oil grooves 55 are arranged on both sides of the first oil groove 56 in a circumferential direction.

Here, the first oil groove 56 has a tapered shape inclined toward a direction spaced apart from a surface of a core plate 20 from the opening portion 56a to the end portion 56b. That is to say, an axial depth of the first oil groove is smallest at the end portion 56b. Further, at the end portion 56b, a circumferential width is smallest.

Further, similarly, each of the second oil grooves 55 has a tapered shape inclined toward a direction spaced apart from the surface of the core plate 20 from the opening portion 55a to the end portion 55b. That is to say, an axial depth of the second oil groove is smallest at the end portion 55b.

In the above-mentioned various embodiments, while an example that the friction plate is formed by securing the plurality of friction material segments to the core plate was explained, after a single friction material is secured to the core plate, oil passages and first and second oil grooves may be formed by a pressing technique. Further, the oil passages may be defined between the friction material segments, and only first and second oil grooves may be formed in the friction material segments by a pressing technique.

Although the first and second oil grooves can be formed by providing notches in the friction material, such oil grooves may be formed by a pressing technique. Further, in many embodiments, while an example that the number of the second oil grooves opened to the outer peripheral edge of the friction plate is greater than the number of the first oil grooves was explained, the number of the second oil grooves may be the same as the number of the first oil grooves.

An end portion of at least one of the first and second oil grooves can be terminated at a position exceeding a center of the friction material in a radial direction. End portions of all of the first and second oil grooves may be terminated at positions exceeding the center of the friction material in the radial direction. By terminating the end portion at the position exceeding the center, a drag torque reducing effect is enhanced.

Although the friction material segments 21 and the friction material are stuck to the core plate 20 by an adhesive, a seal-like friction material segment 21 having a rear surface on which an adhesive is applied may be used, and a friction material may be respect on the core plate 20 and then the friction material may be stuck to the core plate by pressure and heat.

In the above-mentioned embodiments, while an example that the identical friction material segments 21 are arranged on the core plate 20 in the annular fashion was explained, friction material segments 21 having shapes shown in the embodiments may be combined.

Further, in many of the above-mentioned embodiments, a tip end of each first oil groove extending from the inner peripheral edge 26 and a tip end of each second oil groove extending from the outer peripheral edge 27 extend beyond the center in the radial direction. However, the length of each oil groove is optional, and thus, the length of each oil grooves may be longer or shorter than those shown in the various embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-323238 filed on Nov. 8, 2005, which is hereby incorporated by reference herein.

What is claimed is:

1. A friction plate having a friction surface formed by adhering a friction material to a substantially annular core plate, wherein:

said friction surface is provided with an oil passage radially extending between and communicated with inner and outer peripheral edges of said friction plate, at least one first oil groove having an opening portion opened to said inner peripheral edge of said friction plate and a closed end portion terminating at a position between said inner and outer peripheral edges, and a plurality of second oil grooves each having an opening portion opened to said outer peripheral edge of said friction plate and a closed end portion terminating at a position between said inner and outer peripheral edges, and wherein a circumferential width of each first oil groove is the same as that of each second oil groove and the number of said at least one first oil grooves is smaller than that of said second oil grooves.

2. A friction plate according to claim 1, wherein at least one of said first and second oil grooves is inclined in a circumferential direction.

3. A friction plate according to claim 1, wherein an axial depth of each first oil groove is increased from said end portion to said opening portion.

4. A friction plate according to claim 1, wherein an axial depth of each second oil groove is increased from said end portion to said opening portion.

5. A friction plate according to claim 1, wherein axial depths of each of said first and second oil grooves are increased from said end portions to said opening portions, respectively.

6. A friction plate according to claim 1, wherein a radial length of each first oil groove is substantially the same as a radial length of said second oil grooves.

7. A friction plate according to claim 6, wherein said end portion of at least one of said first and second oil grooves terminates at a position exceeding a center of said friction material in a radial direction.

8. A friction plate according to claim 1, wherein a radial length of each first oil groove differs from a radial length of said second oil grooves.

9. A friction plate according to claim 8, wherein said end portion of at least one of said first and second oil grooves terminates at a position exceeding a center of said friction material in a radial direction.

10. A wet-type multi-plate clutch comprising:

friction plates according to claim 1; and separator plates arranged alternately with said friction plates in an axial direction.

11. A friction plate having a friction surface formed by adhering a plurality of friction material segments to a substantially annular core plate, wherein:

said friction surface is provided with an oil passage radially extending between and communicated with inner and outer peripheral edges of said friction plate, at least one first oil groove having an opening portion opened to said inner peripheral edge of said friction plate and a closed end portion terminating at a position between said inner and outer peripheral edges, and a plurality of second oil grooves each having an opening portion opened to said outer peripheral edge of said friction plate and a closed end portion terminating at a position between said inner and outer peripheral edges; and one of said friction material segments including said at least one first oil groove and said second oil grooves, and wherein a circumferential width of each first oil groove is the same as that of each second oil groove and the number of said at least one first oil groove is smaller than that of said second oil grooves.

* * * * *